(12) United States Patent
Nishida (10) Patent No.: US 7,065,017 B2
(45) Date of Patent: Jun. 20, 2006

(54) OPTICAL DISK APPARATUS, METHOD FOR GENERATING CLOCK SIGNAL OF OPTICAL DISK APPARATUS, AND METHOD FOR SETTING AMOUNT OF LIGHT OF OPTICAL DISK APPARATUS

(75) Inventor: Norio Nishida, Kanagawa (JP)

(73) Assignee: Sony Corporation, Tokyo (JP)

( * ) Notice: Subject to any disclaimer, the term of this patent is extended or adjusted under 35 U.S.C. 154(b) by 312 days.

(21) Appl. No.: 10/151,855

(22) Filed: May 22, 2002

(65) Prior Publication Data

US 2002/0181361 A1 Dec. 5, 2002

(30) Foreign Application Priority Data

May 28, 2001 (JP) .............................. 2001-158240

(51) Int. Cl.
*G11B 7/0045* (2006.01)

(52) U.S. Cl. ............................... 369/47.28; 369/59.19; 369/53.34

(58) Field of Classification Search ............ 369/59.19, 369/47.53, 47.28, 47.3, 47.31, 53.34
See application file for complete search history.

(56) References Cited

U.S. PATENT DOCUMENTS

| | | | | |
|---|---|---|---|---|
| 4,675,749 A | * | 6/1987 | Banno et al. ................ | 386/106 |
| 5,020,046 A | * | 5/1991 | Ueda ....................... | 369/47.28 |
| 5,386,405 A | * | 1/1995 | Fujiwara et al. ......... | 369/59.19 |
| 6,269,062 B1 | * | 7/2001 | Minemura et al. ....... | 369/47.53 |
| 6,487,152 B1 | * | 11/2002 | Nakamura ............... | 369/47.53 |
| 6,584,053 B1 | * | 6/2003 | Tsukihashi ............... | 369/53.34 |
| 6,636,467 B1 | * | 10/2003 | Taussig .................... | 369/47.3 |
| 6,775,211 B1 | * | 8/2004 | Tsukihashi ............... | 369/47.28 |

FOREIGN PATENT DOCUMENTS

JP 200040309 A * 2/2000

OTHER PUBLICATIONS

Machine Translation of Japanese Patent Publication No. 2000-040309, published Aug. 2, 2000, by Fujiwara.*

* cited by examiner

*Primary Examiner*—Brian E. Miller
*Assistant Examiner*—Peter Vincent Agustin
(74) *Attorney, Agent, or Firm*—Oblon, Spivak, McClelland, Maier & Neustadt, P.C.

(57) ABSTRACT

An optical disk apparatus and methods for controlling the same are provided. The operational reference is switched between a writing clock signal and a playback signal to generate a playback clock signal. The switching of the operation is executed when the playback of test-writing data is initiated.

7 Claims, 8 Drawing Sheets

FIG. 3 x: RADIAL DIRECTION

OPTICAL DISK APPARATUS, METHOD FOR GENERATING CLOCK SIGNAL OF OPTICAL DISK APPARATUS, AND METHOD FOR SETTING AMOUNT OF LIGHT OF OPTICAL DISK APPARATUS

BACKGROUND OF THE INVENTION

1. Field of the Invention

The present invention relates to an optical disk apparatus and a method for controlling the same. The present invention is applicable to an optical disk apparatus, including a DVD+RW (digital video disk+read/write [with a recording capacity of 4.7 gigabytes]), DVD+R, and DVD-R/RW. The present invention allows for OPC (optimum power calibration) using the amount of jitter as an evaluation reference and using a small area compared to the related art, by switching an operational reference between a writing clock signal and a playback signal to generate a playback clock signal, and by switching the operation when test-writing data is played back.

2. Description of the Related Art

Conventionally, in an optical disk apparatus, OPC is used to set an optimum amount of light for writing, to cope with variations in the characteristics of the information-recording surface of optical disks.

That is, when an optical disk is loaded into an optical disk apparatus and then a command for writing is input, for example, an OPC area provided at the innermost circumference thereof is used to record test-writing data by changing the amount of light sequentially in a step-by-step manner, thereby executing so-called "test writing". The optical disk apparatus is also configured such that it plays back the test-writing data recorded in this manner and uses the playback results based on a predetermined evaluation reference to determine an optimum amount of light.

Figure 9:
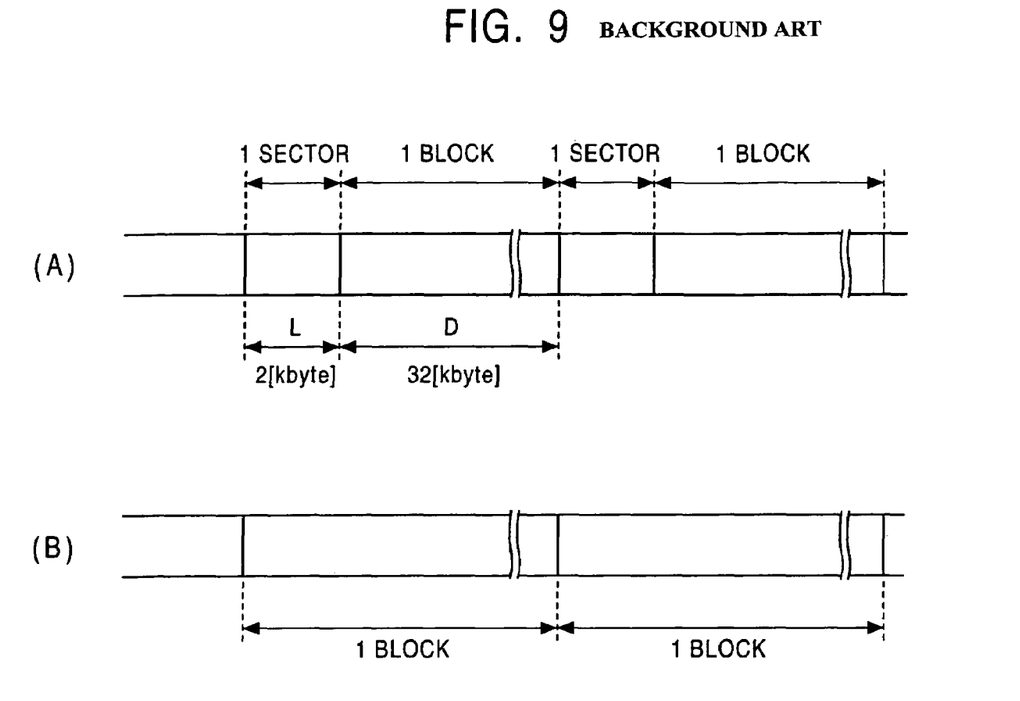
FIG. 9 is a schematic diagram to illustrate the operation of an optical disk apparatus of the related art.

In the case of, for example, a DVD+RW having a recording capacity of 3.0 gigabytes, as shown in part (A) of FIG. 9, data areas D, each occupying one block (32 kilobytes), extend with linking areas, each occupying one sector (2 kilobytes), interposed therebetween, so that data is recorded block by block. Thus, when test writing is performed while the amount of light varies over eight levels, the optical disk apparatus uses eight linking areas and eight blocks for the test writing. In this case, one block corresponds to a length of about one full revolution of the innermost circumference of the optical disk.

As an evaluation reference for such an optimum amount of light, the amount of jitter is determined from the playback result of the test-writing data and is used to determine the optimum amount of light. Thus, when test-writing data is recorded in the format as shown in part (A) of FIG. 9, the optical disk apparatus is configured such that a PLL circuit therein performs synchronization in a linking area and then the amount of jitter is measured from the test-writing data recorded in a data area with reference to a playback clock signal generated by the PLL circuit.

Referring to part (B) of FIG. 9, a DVD+RW having a recording capacity of 4.7 gigabytes has a format that does not include linking areas L. With such a DVD+RW, when conventional OPC is performed, successive blocks are sequentially allotted as areas for the synchronization of a PLL circuit and areas for recording test-writing data, thus posing a problem in that a large area is necessary for the OPC.

In contrast, in the case of an optical disk such as a DVD-R or DVD+R having an information-recording surface that is formed of organic dye, when a large area thereof is used for OPC, the information-recording surface cannot be effectively used due to the difficulty of re-writing. Thus, for such an optical disk on which it is difficult to re-write data, OPC needs to be performed with the smallest possible area and for the greatest possible number of times.

SUMMARY OF THE INVENTION

The present invention has been made in view of the foregoing, and an object thereof is to provide an optical disk apparatus that allows OPC using the amount of jitter as an evaluation reference and using a small area compared to the related art, a method for generating a clock signal of the optical disk apparatus, and a method for setting an amount of light of the optical disk apparatus.

To achieve the above object, according to a first aspect of the present invention, there is provided an optical disk apparatus. The optical disk apparatus includes a wobble-signal generating section for generating a wobble signal having a signal level that varies in accordance with the meander of a groove in an optical disk by processing a result of received return-light obtained by irradiating the optical disk with a laser beam, and a playback-signal generating section for generating a playback signal having a signal level that varies in accordance with a series of pits formed in the optical disk by processing the result of the received return-light. The optical disk apparatus further includes a writing-clock-signal generating section for generating a writing clock signal that serves as a reference for generating the series of pits, with reference to the wobble signal; and a playback-clock-signal generating section for generating a playback clock signal that serves as a reference for playing back the series of pits, by switching an operational reference between the writing clock signal and the playback signal.

According to a second aspect of the present invention, there is provided a method for generating a clock signal of an optical disk apparatus. In this method, the optical disk apparatus includes a wobble-signal generating section for generating a wobble signal having a signal level that varies in accordance with the meander of a groove in an optical disk by processing a result of received return-light obtained by irradiating the optical disk with a laser beam; a playback-signal generating section for generating a playback signal having a signal level that varies in accordance with a series of pits formed in the optical disk by processing the result of the received return-light; and a writing-clock-signal generating section for generating a writing clock signal that serves as a reference for generating the series of pits, with reference to the wobble signal. The method includes a playback-clock generating step of generating a playback clock signal that serves as a reference for playing back the series of pits by switching an operational reference between the writing clock signal and the playback signal.

According to a third aspect of the present invention, there is provided a method for setting the amount of light of an optical disk apparatus. In this method, the optical disk apparatus includes a wobble-signal generating section for generating a wobble signal having a signal level that varies in accordance with the meander of a groove in an optical disk by processing a result of received return-light obtained by irradiating the optical disk with a laser beam; a playback-signal generating section for generating a playback signal having a signal level that varies in accordance with a series of pits formed in the optical disk by processing the result of the received return-light; a writing-clock-signal generating section for generating a writing clock signal that serves as a reference for generating the series of pits, with reference to the wobble signal; and a playback-clock-signal generating section for generating a playback clock signal that serves as a reference for playing back the series of pits, with reference to the playback signal. The method includes a test-writing step of recording predetermined test-writing data on the optical disk by changing the amount of light of the laser beam in a step-by-step manner with reference to the writing clock signal; a jitter measuring step of measuring the amount of jitter for each amount of light by processing the playback signal with reference to the playback clock signal, the playback signal being obtained by playing back the test-writing data; and a light-intensity setting step of setting the amount of light of the laser beam in accordance with the result of measuring the amount of jitter. The playback-clock-signal generating section generates the playback clock signal based on the writing clock signal as an operational reference from a predetermined time before the playback of the test-writing data is initiated and switches the operational reference from the writing clock signal to the playback signal after the playback of the test-writing data is initiated, and when a predetermined time has elapsed after the switching of the operational reference, the jitter measuring step initiates measuring the amount of jitter.

According to a fourth aspect of the present invention, there is provided a method for setting the amount of light of an optical disk apparatus. In this method, the optical disk apparatus includes a wobble-signal generating section for generating a wobble signal having a signal level that varies in accordance with the meander of a groove in an optical disk by processing a result of received return-light obtained by irradiating the optical disk with a laser beam; a playback-signal generating section for generating a playback signal having a signal level that varies in accordance with a series of pits formed in the optical disk by processing the result of the received return-light; a writing-clock-signal generating section for generating a writing clock signal that serves as a reference for generating the series of pits, with reference to the wobble signal; and a playback-clock-signal generating section for generating a playback clock signal that serves as a reference for playing back the series of pits, with reference to the playback signal. The method includes a test-writing step of recording predetermined test-writing data on the optical disk by changing the amount of light of the laser beam in a step-by-step manner with reference to the writing clock signal; a jitter measuring step of measuring the amount of jitter for each amount of light by processing the playback signal with reference to the playback clock signal, the playback signal being obtained by playing back the test-writing data; and a light-intensity setting step of setting the amount of light of the laser beam in accordance with the result of measuring the amount of jitter. The playback-clock-signal generating means generates the playback clock signal based on the writing clock signal as an operational reference from a predetermined time before the playback of the test-writing data for each amount of light is initiated and the playback-clock-signal generating means switches the operational reference from the writing clock signal to the playback signal after the playback of the test-writing data for each amount of light is initiated, and when a predetermined time has elapsed after the switching of the operational reference, the jitter measuring step initiates measuring the amount of jitter.

According to the first aspect of the present invention, in the optical disk apparatus, the operational reference is switched between the writing clock signal and the playback signal to generate the playback clock signal that serves as a reference for playing back the series of pits. With this arrangement, the operation is switched from the generation of the playback clock signal based on the writing clock signal as the operational reference to the generation of the playback clock signal based on the playback signal as the operational reference, so that the playback clock signal can be synchronized with the playback signal in a short period of time. This makes it possible to initiate the playback of desired data in a short period of time. In addition, in OPC, this arrangement allows secure detection of an optimum amount of light based on an amount of jitter by processing a playback result, even when a small area is used to record test-writing data.

The method according to the second aspect of the present invention can generate a clock signal of an optical disk apparatus that allows for OPC based on an amount of jitter as an evaluation reference using a small area compared to the related art.

According to the third aspect of the present invention, the playback-clock-signal generating section generates the playback clock signal based on the writing clock signal as an operational reference from a predetermined time before the playback of the test-writing data is initiated and switches the operational reference from the writing clock signal to the playback signal after the playback of the test-writing data is initiated, and when a predetermined time has elapsed after the switching of the operational reference, the jitter measuring step initiates measuring the amount of jitter. Thus, at the time when the playback of the test-writing data is initiated, the operational reference can be switched to the original playback signal in a state in which the playback clock signal is fully synchronized with the writing clock signal. This allows the playback clock signal to be synchronized with the playback signal in a short period of time. This arrangement also allows the measurement of an amount of jitter with satisfactory accuracy, even when the period from the switching of the operation to the initiation of the jitter measurement is significantly reduced compared to the related art. Thus, the third aspect of the present invention allows for OPC based on an amount of jitter as the evaluation reference using a small area compared to the related art.

According to the fourth aspect of the present invention, the period in which the operational reference is switched to the writing clock signal is set for each test-writing data with each amount of light. This allows the operational reference to be switched to the original playback signal in a state in which the playback clock signal is fully synchronized with the writing clock signal for each playback of the test-writing data with each amount of light. This arrangement allows the playback clock signal to be synchronized with the playback signal in a short period of time for each light intensity, even when an amount of light for test writing significantly deviates from an appropriate amount of light and also the playback signal is deteriorated. Thus, this arrangement allows for OPC based on an amount of jitter as the operational reference using a small area compared to the related art.

Thus, according to the present invention described above, the operational reference is switched between the writing clock signal and the playback signal to generate the playback clock signal and the switching of the operation is executed when the playback of test-writing data is initiated. This allows processing, such as OPC, based on an amount of jitter as the evaluation reference using a small area compared to the related art.

DESCRIPTION OF THE PREFERRED EMBODIMENTS

Embodiments of the present invention will be detailed below with reference to the accompanying drawings.

(1) First Embodiment

Figure 2:
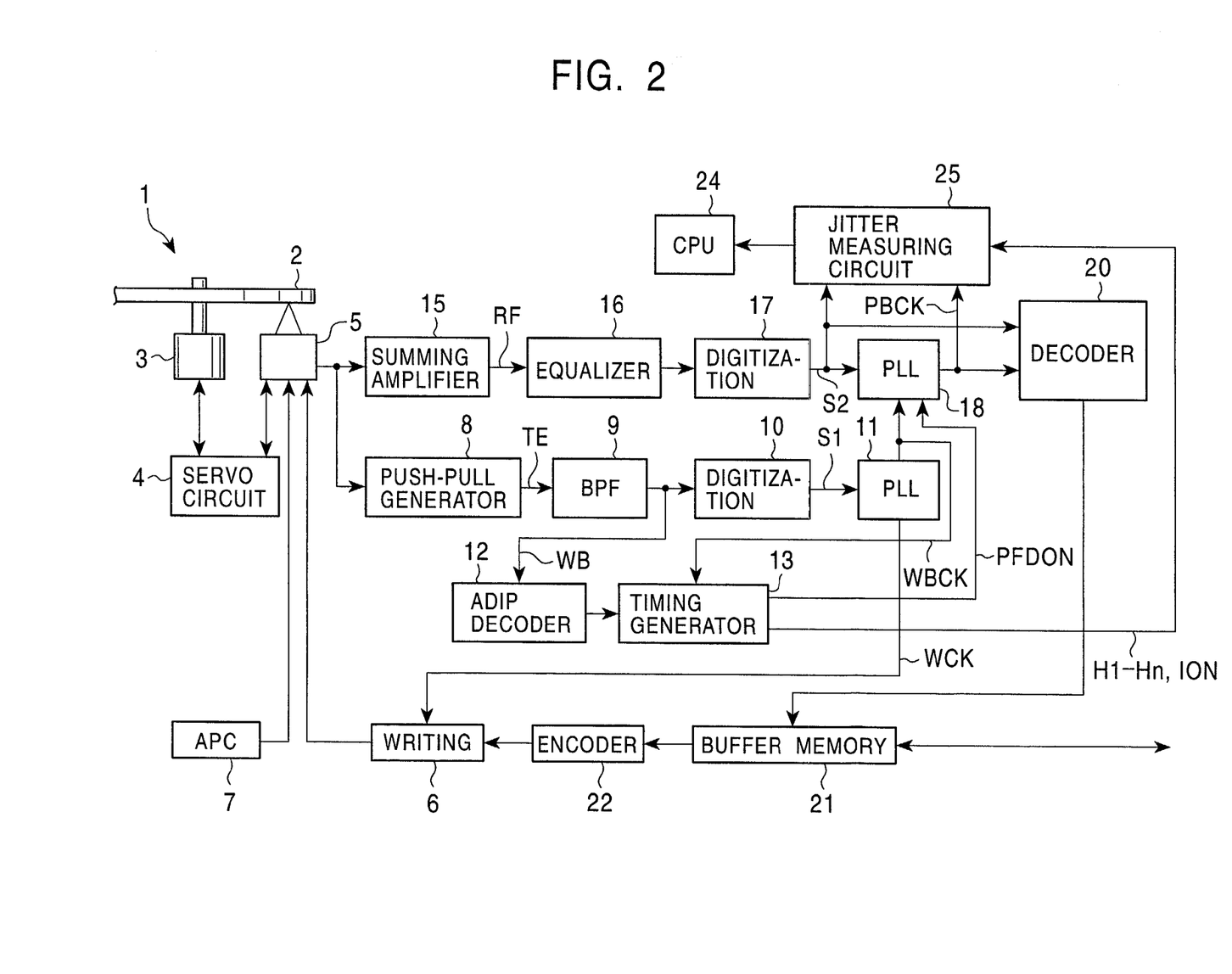
FIG. 2 is a block diagram of the optical disk apparatus according to the first embodiment of the present invention.

FIG. 2 is a block diagram of an optical disk apparatus according to a first embodiment of the present invention. The optical disk apparatus 1 accesses an optical disk 2 which is a DVD+RW having a recording capacity of 4.7 gigabytes.

In the optical disk apparatus 1, under the control of a servo circuit 4, a spindle motor 3 drives the optical disk 2 to spin at a predetermined rotational speed.

An optical pickup 5 is held by a sled mechanism (not shown), which is driven by the servo circuit 4, so as to be movable in the radial direction of the optical disk 2, thereby allowing operations such as a seek operation. The optical pickup 5 divides a laser beam emitted from a built-in semiconductor laser into a main beam and side beams using a diffraction grating, and focuses the beams through an objective lens onto the information-recording surface of the optical disk 2. The optical pickup 5 then picks up the return light of the main and side beams through the objective lens and receives the return light using light-receiving elements, which are described below.

Figure 3:
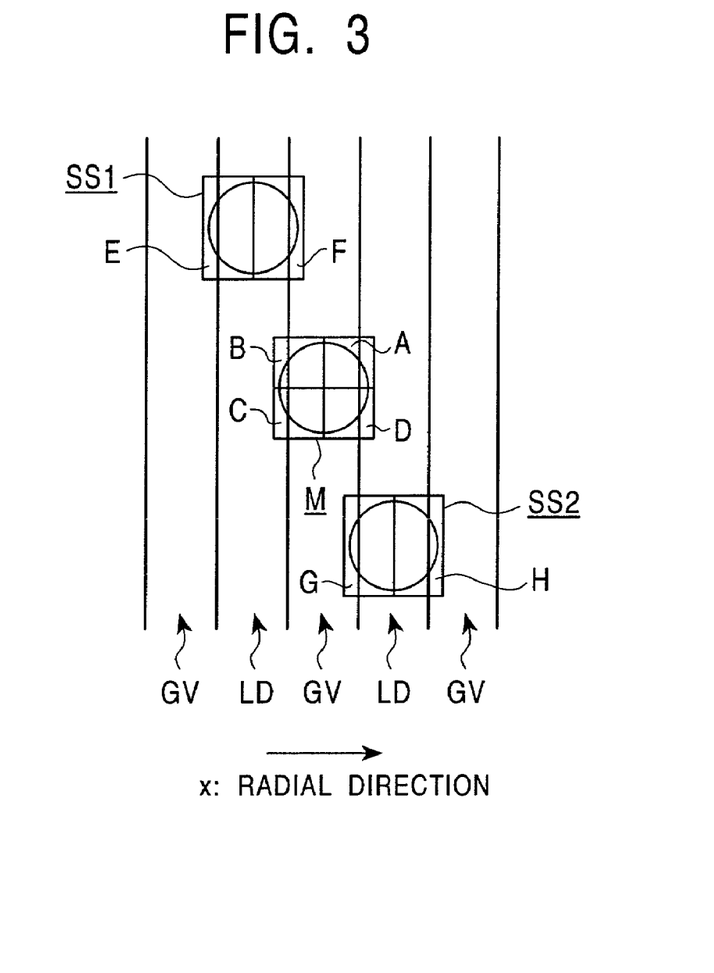
FIG. 3 is a plan view illustrating the arrangement of light-receiving elements of an optical pickup of the optical disk shown in FIG. 2.

Referring now to FIG. 3, the optical pickup 5 includes light-receiving elements M, SS1, and SS2 for receiving the return light of the main and side beams. The light-receiving surface of each of the light-receiving elements M, SS1, and SS2 is divided by a dividing line extending in the longitudinal direction of the tracks. The light-receiving surface of the light-receiving element M, which receives the return light of the main beam, is further divided by a dividing line extending in the radial direction of the optical disk 2. The results of light received by regions A to H, which are divided as described above, are output in conjunction with the result of the amount of monitored light of the laser beam. In FIG. 3, the light-receiving surface of each of the light-receiving elements M, SS1, and SS2 is shown in relation to the optical disk 2. Portions that are indicated by reference symbols LD and GV represent lands and grooves, respectively. Further, during writing, under the control of a writing circuit 6, the optical pickup 5 intermittently causes the amount of light of the laser beam to rise in accordance with data to be recorded, thereby sequentially forming a series of pits in the optical disk 2.

The servo circuit 4 moves the objective lens of the optical pickup 5 in accordance with a tracking error signal TE and a focus error signal which are obtained by processing the results of the light received by the optical pickup 5, thereby executing tracking control and focus control. The servo circuit 4 also moves the optical pickup 5 in the radial direction of the optical disk 2, with reference to the address of a spot irradiated with a laser beam, the address being also obtained by processing the results of the received light, and further drives the spindle motor 3 with reference to a wobble clock signal WBCK, which is described later.

An APC (automatic power control) circuit 7 actuates the semiconductor laser of the optical pickup 5 with reference to the result of the amount of monitored light of the laser beam, the result being obtained by the optical pickup 5, so as to control the amount of light of the laser beam with which the optical disk 2 is irradiated. In this case, for OPC (optimum power calibration), in accordance with an instruction from a central processing unit (CPU) 24, the APC circuit 7 changes the amount of light for writing, sequentially in a step-by-step manner, in association with processing of the writing circuit 6. On the other hand, for ordinary writing, the APC circuit 7 controls the amount of light of the laser beam such that the amount of light becomes the optimum writing intensity determined by the OPC, in accordance with a setting of the central processing unit 24.

A push-pull generator circuit 8 processes the results of the light received, which is output from the optical pickup 5, to generate a tracking error signal TE on a push-pull system. This tracking error signal TE is generated in such a manner that signals output from the light-receiving element M, which receives the main beam, are used to determine the difference between the results of light received by the light-receiving regions divided in the radial direction of the optical disk 2. Thus, in this embodiment, the tracking error signal TE is expressed by (A+D)−(B+C), where A to D represent signals output from the corresponding light-receiving regions A to D on the light-receiving element M shown in FIG. 3, and varies in signal level depending on the amount of tracking error. The push-pull generator circuit 8 outputs the tracking error signal TE to the servo circuit 4 and a bandpass filter (BPF) 9.

The bandpass filter 9 extracts signal components within a predetermined frequency band from the tracking error signal TE and outputs a wobble signal WB having a signal level that varies in accordance with the meander of the grooves.

A digitizing circuit 10 digitizes the wobble signal WB to output a digitized signal S1. A PLL circuit 11 processes the digitized signal S1 to generate and output a wobble clock signal WBCK, which is in synchronization with the meander of the grooves, and a writing clock signal WCK, which serves as a reference for generating pits and is maintained to have a certain relationship with the wobble clock signal WBCK.

An ADIP (address in pre-groove) decoder 12 demodulates the frequency of the wobble signal WB to decode the address of a spot irradiated with a laser beam. Based on the result of the decoding, a timing generator circuit 13 uses the wobble clock signal WBCK to generate and output various timing signals PFDON, H1 to Hn, and ION which are necessary for the operation of the optical disk apparatus 1.

Based on the result of light received by the optical pickup 5, a summing amplifier 15 generates and outputs a playback signal RF having a signal level that varies in accordance with a series of pits formed in the optical disk 2. This playback signal RF is a signal expressed by adding all the results of light received by the light-receiving element M, i.e., by RF=A+B+C+D in relation to FIG. 3. In the optical disk apparatus 1, a processing circuit (not shown) further processes the result of light received, in addition to the summing amplifier 15 and the push-pull generator circuit 8 which process the result of light received, so as to generate the focus error signal and the like.

An equalizer 16 equalizes the waveform of the playback signal RF, and a digitizing circuit 17 subsequent thereto digitizes a signal output from the equalizer 16 and outputs a digitized signal S2. A PLL circuit 18 processes the digitized signal S2 with reference to the wobble clock signal WBCK, thereby playing back a clock signal from the playback signal RF, and outputs the clock as a playback clock signal PBCK that serves as a reference for playing back a series of pits.

In the process of generating the playback clock signal PBCK, in accordance with the timing signal PFDON output from the timing generator circuit 13, the PLL circuit 18 switches its operation between the process of generating the playback clock signal PBCK with reference to the digitized signal S2 and the process of generating the playback clock signal PBCK with reference to the wobble clock signal WBCK. That is, the PLL circuit 18 is configured to switch the operational reference between the playback signal RF and the writing clock signal WCK so that the playback clock signal PBCK is securely synchronized with the playback signal RF in a short period of time.

A decoder 20 sequentially latches and processes the digitized signal S2 with reference to the playback clock signal PBCK, or digitally identifies and processes the playback signal RF directly to play back data recorded on the optical disk 2. The decoder 20 then outputs the data. A buffer memory 21 temporarily stores the data played back by the decoder 20 and outputs the data to a host device through an interface (not shown). In this manner, the optical disk apparatus 1 plays back data recorded on the optical disk 2 and outputs the data to a host device.

On the other hand, the buffer memory 21 receives data to be recorded from the host device through the interface, and outputs the data to an encoder 22. The encoder 22 modulates the data to be recorded, in a format suitable for recording on the optical disk 2, and outputs the result of the modulation in the form of serial data to the writing circuit 6.

In response to the data output from the encoder 22, the writing circuit 6 causes its signal level to rise at a certain timing with reference to the writing clock signal WCK to generate a driving signal, which controls the semiconductor laser of the optical pickup 5. With this arrangement, the optical disk apparatus 1 can sequentially generate a series of pits in the optical disk 2 to record desired data. In addition, in this embodiment, in response to an instruction for performing test writing for OPC from the central processing unit 24, the writing circuit 6 generates and outputs a driving signal using predetermined test-writing data, with reference to the timing signals output from the timing generator circuit 13, and repeats this process sector by sector. In this embodiment, the test-writing data is recorded in a random pattern.

Thus, the optical disk device 1 according to this embodiment is configured to reduce the area for recording test-writing data for each amount of light and to omit linking data between two pieces of test-writing data for each amount of light. For example, when the amount of light is varied over eight levels, performing test writing once consume eight sectors. In this manner, the optical disk apparatus 1 is configured to execute test writing sector by sector.

When OPC is performed, a jitter measuring circuit 25 processes the digitized signal S2 with reference to the playback clock signal PBCK to measure the jitter of the playback signal RF, and outputs the result of the measurement to the central processing unit 24.

The central processing unit 24 is a controller for controlling the operation of the entire optical disk apparatus 1. When the optical disk 2 is loaded into the optical disk apparatus 1, the central processing unit 24 moves the optical pickup 5 for a seek operation to obtain data to be played back by the decoder 20, thereby obtaining various types of management data necessary for processing the optical disk 2. In response to an instruction from the host device, under the control of the central processing unit 24 that is based on the management data obtained in that manner, the optical disk apparatus 1 accesses the optical disk 2.

Subsequent to this process or in response to input of a writing command from the host device, the central processing unit 24 controls the operation of the entire optical disk device 1 so as to execute the OPC. That is, first, the central processing unit 24 controls the entire operation so as to move the optical pickup 5 for a seek operation into an OPC area. The central processing unit 24 then controls the APC circuit 7, the writing circuit 6, and so on to record predetermined test-writing data in the OPC area by varying the amount of light for writing, sequentially in a step-by-step manner, thereby executing test writing.

Figure 4:
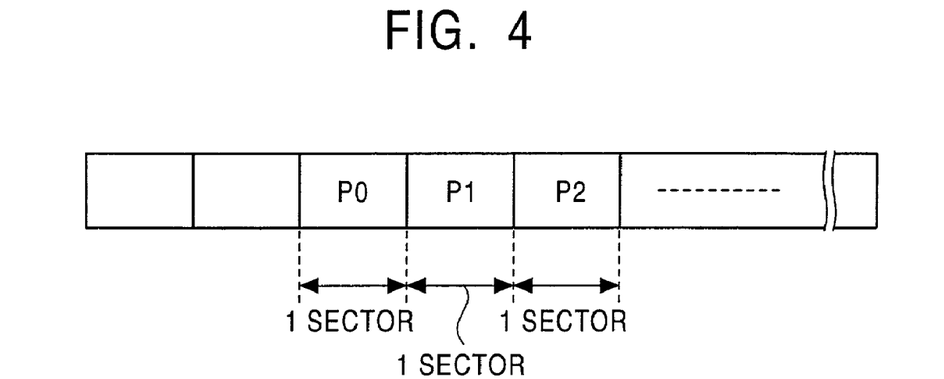
FIG. 4 is a schematic diagram to illustrate test writing.

As described above, the writing circuit 6 and the APC circuit 7 changes the amount of light for writing to levels P0, P1, and P2, as shown in FIG. 4, sequentially in a step-by-step manner sector by sector to record the test-writing data.

Upon completing the test writing process, the central processing unit 24 issues an instruction for playing back the test-writing data that has been recorded, and obtains the result for the amount of jitter measured by the jitter measuring circuit 25. In accordance with the measurement result for the amount of jitter, the central processing unit 24 determines an amount of light for writing at which the amount of jitter is minimized, and sets the amount of light for writing, in the APC circuit 7, as the optimum amount of light for writing.

Figure 1:
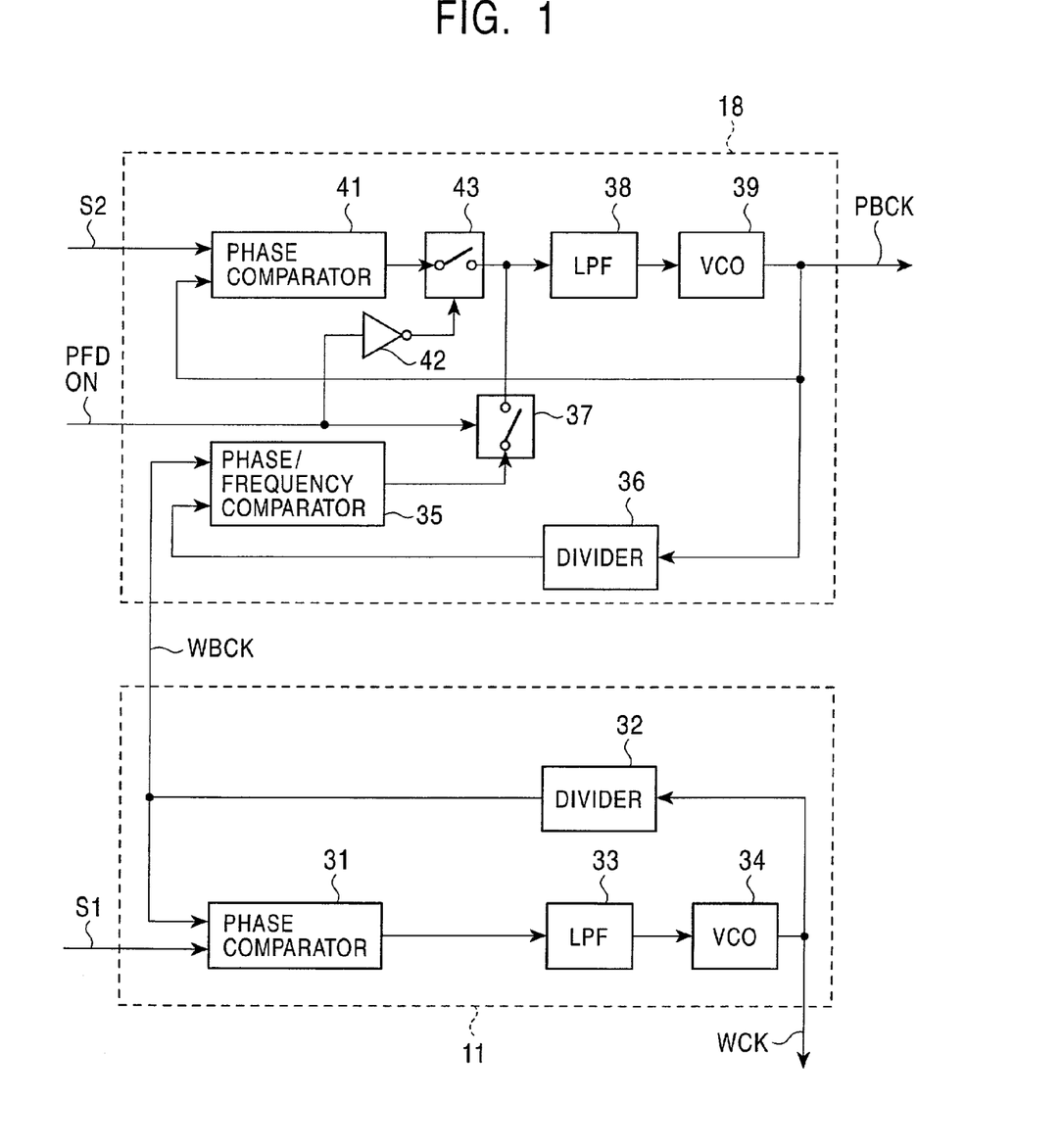
FIG. 1 is a block diagram of PLL circuits of an optical disk apparatus according to a first embodiment of the present invention.

FIG. 1 is a block diagram of the detailed configuration of the PLL circuits 11 and 18. In the PLL circuit 11, a phase/frequency comparator circuit 31 compares the phases and frequencies of the wobble clock signal WBCK output from a divider circuit 32 and the digitized signal S1, and outputs an error signal indicating the result of the comparison. A low-pass filter (LPF) 33 limits the bandwidth of the error signal and outputs the resulting signal. In response to the signal output from the low-pass filter 33, a voltage-controlled oscillator (VCO) 34 changes the frequency thereof to generate the writing clock signal WCK. The divider circuit 32 divides the frequency of the writing clock signal WCK by a predetermined division ratio and outputs the wobble clock signal WBCK. In this embodiment, the division ratio of the divider circuit 32 is set to be 1/32, since the optical disk 2 is a DVD+RW having a recording capacity of 4.7 gigabytes.

With this arrangement, the PLL circuit 11 forms a feedback loop, and is configured to generate the wobble clock signal WBCK so that the wobble clock signal WBCK synchronizes with the wobble signal WB, that is to say, so that the wobble clock signal WBCK synchronizes with the meander of the grooves formed in the optical disk 2. In addition, the PLL circuit 11 is configured to generate the writing clock signal WCK in synchronization with the wobble clock signal WBCK.

Figure 5:
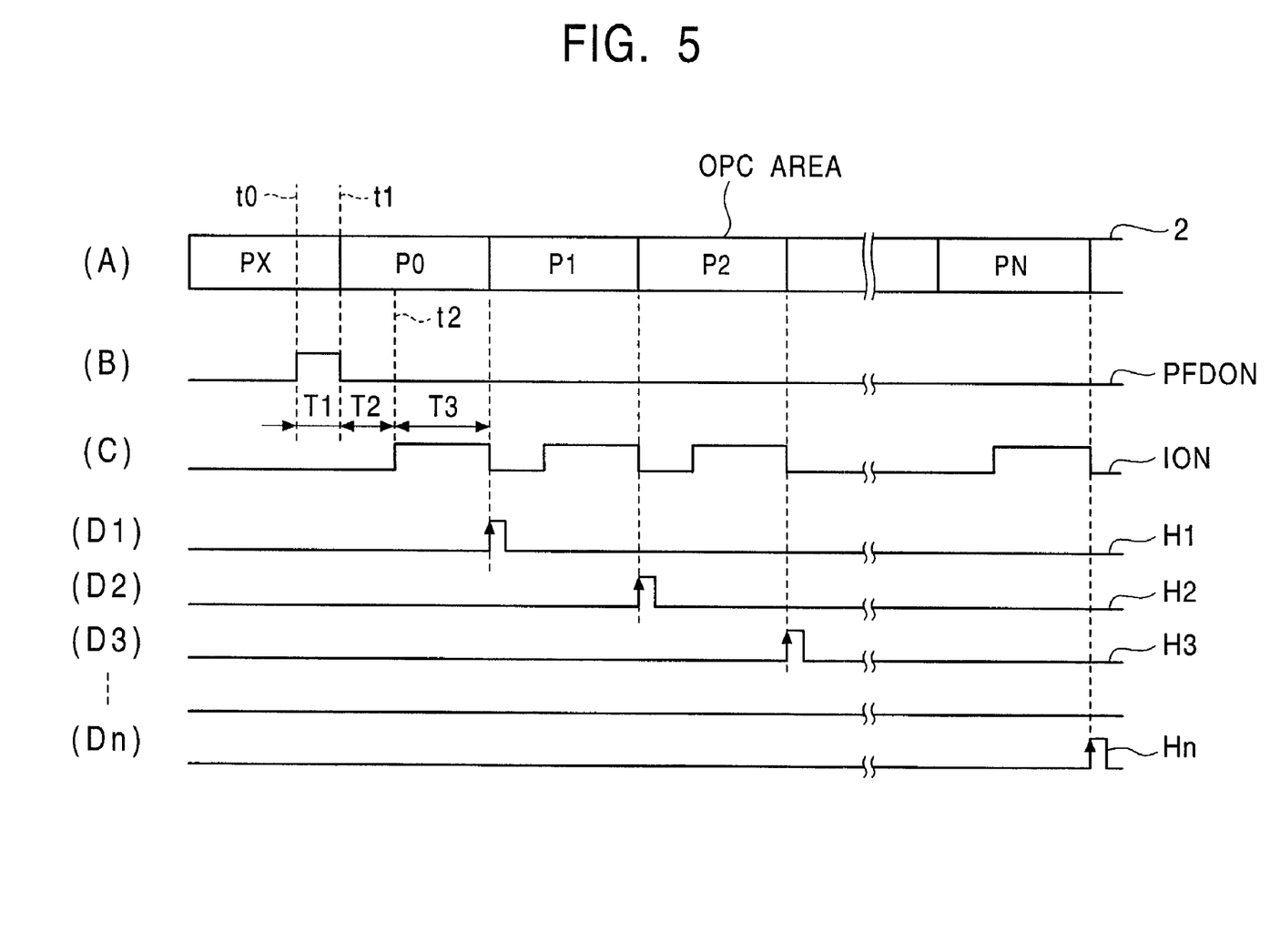
FIG. 5 is a time chart to illustrate the operation of the PLL circuits.

In the PLL circuit 18, a phase/frequency comparator circuit 35 compares the phases and frequencies of a signal output from a divider circuit 36 and the wobble clock signal WBCK output from the PLL circuit 11, and outputs an error signal indicating the result of the comparison. A switch circuit 37 is switched to the ON state in response to the timing signal PFDON output from timing generator circuit 13, to thereby output the error signal, output from the phase/frequency comparator circuit 35, to a low-pass filter (LPF) 38. In this case, as shown in FIG. 5 and particularly in traces (A) and (B) of FIG. 5, the signal level of the timing signal PFDON rises at a predetermined time point to in the OPC area and then falls at time t1 at which scanning of a starting sector (a sector with amount of light P0), in which test-writing data has been written, is initiated. The switch circuit 37 is configured such that it is switched to the ON state for a time period T1 in which the signal level of the timing signal PFDON is high.

The low-pass filter 38 limits the bandwidth of the error signal output from the switch circuit 37 and outputs the resulting signal. In response to the signal output from the low-pass filter 38, a voltage-controlled oscillator (VCO) 39 varies the frequency thereof to generate the playback clock signal PBCK. The divider circuit 36 divides the frequency of the playback clock signal PBCK by a predetermined division ratio and outputs the resulting signal. With this arrangement, the PLL circuit 18 forms a feedback loop. Thus, the PLL circuit 18 is configured to generate the playback clock signal PBCK when the switch circuit 37 is switched to the ON state in the time period T1. In this case, the playback clock signal PBCK is generated so that the signal output from the divider circuit 36 synchronizes with the wobble clock signal WBCK, that is to say, so that the operational reference is set to the writing clock signal WCK that is a source of the wobble clock signal WBCK.

In this case, the divider circuit 36 is set to have the same division ratio as that of the divider circuit 32 of the PLL circuit 11 that generates the wobble clock signal WBCK, so that the PLL circuit 18 can synchronize the playback clock signal PBCK with the writing clock signal WCK. Thus, since the writing clock signal WCK serves as a reference signal when writing is performed onto the optical disk 2, the playback clock signal PBCK that is generated with the switch circuit 37 being set to the ON state, as described above, is maintained to have the same frequency as the clock that constitutes the playback signal RF.

In the PLL circuit 18, a phase comparator circuit 41 compares the phases of the playback clock signal PBCK and the digitized signal S2, which is a digitized playback signal RF, and outputs the result of the phase comparison to a switch circuit 43. An inverter 42 inverts the polarity of the timing signal PFDON and outputs a signal. When the signal level of the signal output from the inverter 42 rises, the switch circuit 43 is switched to the ON state to output the signal, output from the phase comparator circuit 41, to the low-pass filter 38.

Thus, since the signal output from the inverter 42 is a signal having a polarity inverted with respect to the timing signal PFDON, the switch circuits 37 and 43 are switched such that the settings thereof are complementary to each other. Thus, the PLL circuit 18 is configured such that it can switch the operational reference of the voltage-controlled oscillator 39 between the signal output from the phase-frequency comparator circuit 35 and the signal output from the phase comparator circuit 41.

In this embodiment, the time period T1 (trace (B) of FIG. 5), in which the switch circuit 37 is held in the ON state, is set to a time period that is long enough for the frequency of at least the playback clock signal PBCK to match the frequency of the writing clock signal WCK. With this arrangement, when the switch circuits 37 and 38 are switched at time t1, the PLL circuit 18 compensates for the phase of the playback clock signal PBCK such that the phase thereof is synchronized with the phase of the digitized signal S2. In this case, the phase compensation is performed in the state in which the frequency of the playback clock signal PBCK has already been set to the same frequency as the digitized signal S2, which has the same frequency as the writing clock signal WCK. This arrangement allows the playback clock signal PBCK to be synchronized with the playback signal RF in a significantly reduced period of time compared to the related art.

That is, if an attempt is made to synchronize the playback clock signal PBCK with the digitized signal S2 without any measure for matching the frequencies, in the course of the synchronization, a state (so called "pseudo lock") in which the frequency of the playback clock signal PBCK is synchronized with a frequency other than the frequency of the digitized signal S2 occurs. As a result, it takes time for the playback clock signal PBCK to be properly synchronized with the playback signal RF. In this embodiment, however, the writing clock signal WCK is pre-set as the operational reference to operate the PLL circuit 18, so that the operation frequency of the PLL circuit 18 (the frequency of the playback clock signal PBCK) is held to be the same as the frequency of the corresponding signal, i.e., the writing clock signal WCK. This arrangement can effectively avoid the pseudo lock so that the lock state of the PLL circuit 18 is achieved in a short period of time. In addition, this arrangement can ensure measurement of the amount of jitter for each sector, even when test-writing data is recorded sector by sector by changing the amount of light sequentially in a step-by-step manner.

Figure 6:
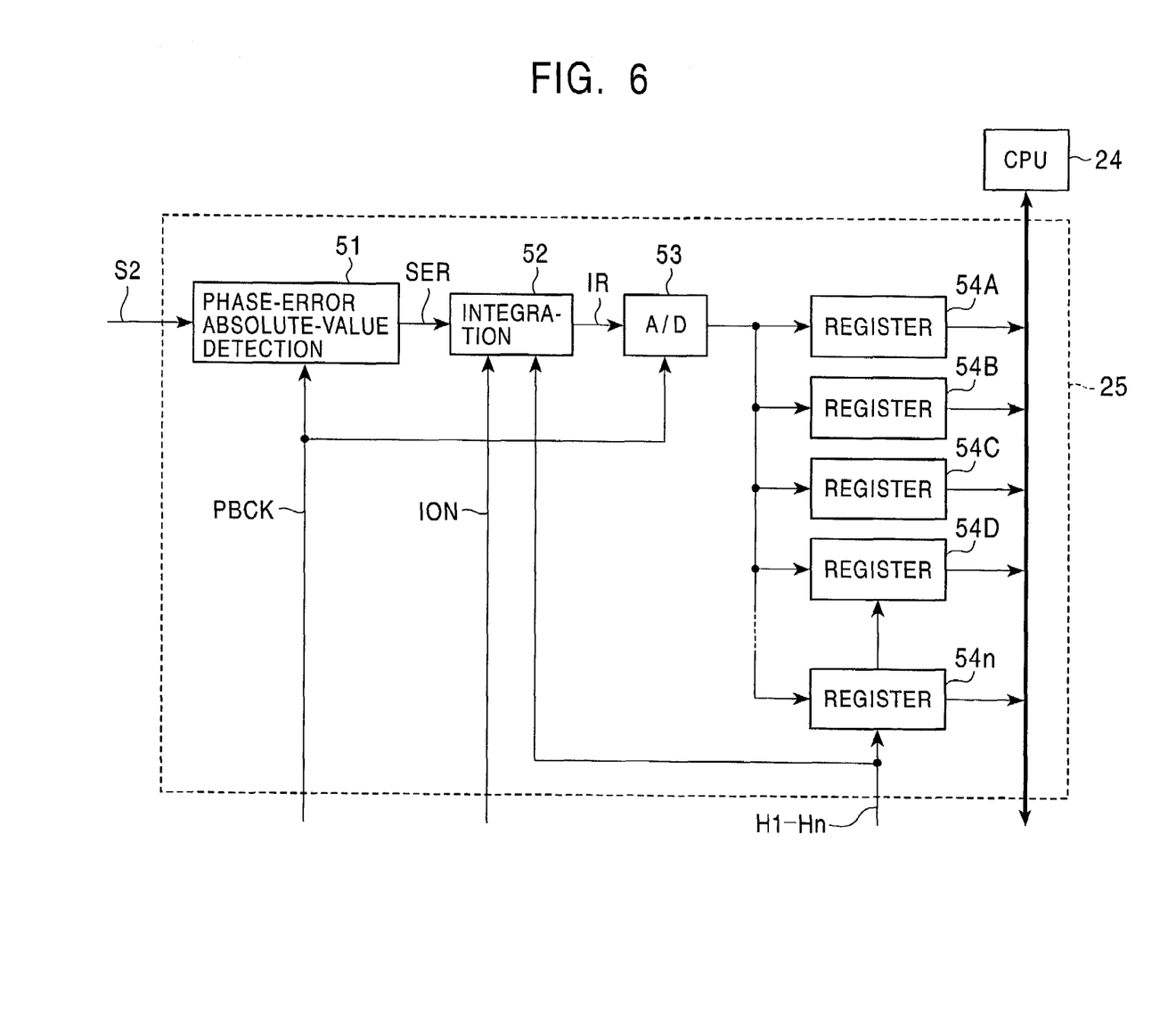
FIG. 6 is a block diagram of a jitter measuring circuit of the optical disk apparatus shown in FIG. 2.
Figure 7:
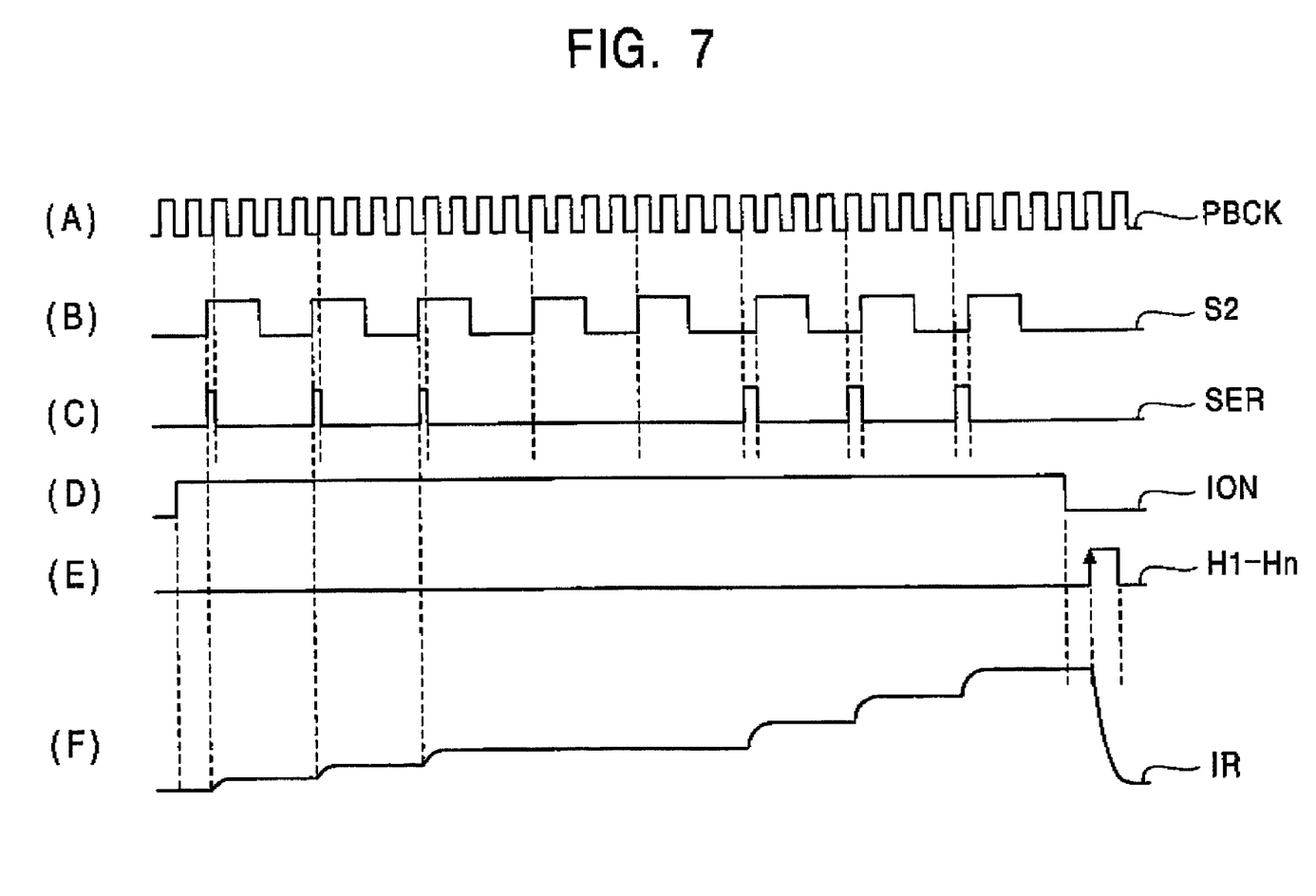
FIG. 7 is a time chart to illustrate the operation of the jitter measuring circuit shown in FIG. 6.

FIG. 6 is a block diagram of the jitter measuring circuit 25. A phase-error absolute-value detector circuit 51 in the jitter measuring circuit 25 processes the playback clock signal PBCK (part (A) of FIG. 7) and the digitized signal S2 (trace (B) of FIG. 7) resulting from the playback signal RF, to generate and output an error detection signal SER (trace (C) of FIG. 7). The signal level of the error detection signal SER becomes high during the period between when the digitized signal S2 rises and when the corresponding playback clock signal PBCK rises. In the period when the signal level of the error detection signal SER is high, the phase-error absolute-value detector circuit 51 determines the absolute value of a phase-error at the rising edge of the digitized signal S2 with reference to the playback clock signal PBCK and provides the resulting value. FIG. 7 illustrates a case in which pits and marks are repeated with a period 3T relative to the period T of the writing clock signal WCK.

An integration circuit 52 is configured to integrate the error detection signal SER in the period when the signal level of the timing signal ION is high, and also resets the integration result in response to the timing signals H1 to Hn. As shown in trace (C) of FIG. 5 and trace (D) of FIG. 7, after the operational reference of the PLL circuit 18 is switched to the playback signal RF by the timing generator circuit 13 at time t1, and at time t2 at which the time period T2, which is long enough for the playback clock signal PBCK to be synchronized with the digitized signal S2 of the playback signal RF in the PLL circuit 18 and to stabilize, has elapsed, the signal level of the timing signal ION rises. The signal level thereof then falls immediately prior to the beginning of the subsequent sector. The signal level switching performed in the starting sector in which test-writing data has been recorded is also repeated in the subsequent sectors in which test-writing data has been recorded. The optical disk apparatus 1 of this embodiment can stabilize the playback clock signal PBCK to a sufficient degree and is also configured to measure jitter with the same measuring time for each sector.

On the other hand, the timing signals H1 to Hn are signals used for storing individual measurement results of the amount of jitter into the registers 54A to 54n. As shown in traces (D1) to (Dn) of FIG. 5 and trace (F) of FIG. 7, in the timing generator circuit 13, the timing signal H1 to Hn rise when corresponding sectors are played back, in the periods between the falling of the signal level of the timing signal ION and the rising of the signal level of the subsequent timing signal ION (immediately subsequent to the falling of the timing signal ION in this embodiment). With this arrangement, the integration circuit 52 integrates the phase error for each amount of light and outputs the integration result IR.

An analog-to-digital converter circuit 53 operates with reference to the playback clock signal PBCK and sequentially performs analog-to-digital conversion on the integration result IR from the integration circuit 52. The registers 54A to 54n temporarily store the integration results, for corresponding amounts of light, output from the analog-to-digital converter circuit 53, and latch data output from the analog-to-digital converter circuit 53 with reference to the corresponding timing signals H1 to Hn. Under the control of central processing unit 24, the registers 54A to 54n also output the data held in this manner to the central processing unit 24.

(2) Operation of First Embodiment

With the configuration described above, when the optical disk 2 is loaded into the optical disk apparatus 1, under the control of the central processing unit 24, management information necessary for accessing the optical disk 2 is played back from the optical disk 2, allowing the access to the optical disk 2 in response to a command from the host device.

In the optical disk apparatus 1, subsequent to the playback of the management data or in response to a writing command from the host device, the central processing unit 24 issues an instruction for moving the optical pickup 5 for a seek operation into an OPC area. The push-pull generator circuit 8 processes the result of received return-light which is obtained by the optical pickup 5 irradiating the optical disk 2 with a laser beam, so as to generate the tracking error signal TE. The bandpass filter 9 subsequent thereto uses the tracking error signal TE to detect the wobble signal WB having a signal level that varies in accordance with the meander of the grooves. In the optical disk apparatus 1, the ADIP decoder 12 processes the wobble signal WB to detect the positional information of a spot irradiated with the laser beam. With reference to the positional information, the servo circuit 4 causes the optical pickup 5 to move for a seek operation into the OPC area.

As shown in FIG. 1, the digitizing circuit 10 digitizes the wobble signal WB to generate the digitized signal S1. With reference to the digitized signal S1, the PLL circuit 11 generates the writing clock signal WCK that serves as a reference for generating a series of pits, and also divides the frequency of the writing clock signal WCK to generate the wobble clock signal WBCK that is in phase synchronization with the digitized signal S1.

The optical disk apparatus 1 changes the amount of light sequentially in a step-by-step manner with reference to the writing clock signal WCK to record test-writing data in the OPC area, thereby executing test writing in OPC. In this case, subsequent to a sector in which test-writing has been performed, the optical disk apparatus 1 changes the amount of light sequentially in a step-by-step manner sector by sector, as shown in FIG. 4, so as to record test-writing data. For example, performing test writing once consumes eight sectors. Thus, according to this embodiment, even when test writing is performed on the optical disk 2 having a format that does not include linking areas, as shown in part (B) of FIG. 9, the test writing is completed by consuming a small area, compared to the related art.

Upon the completion of the test writing in this manner, in the optical disk apparatus 1, the central processing unit 24 controls the servo circuit 4 and the like to play back the OPC area in which test writing has been performed. The summing amplifier 15 processes the result of light returned from the optical disk 2 to generate the playback signal RF having a signal level that varies in accordance with a series of pits. The equalizer 16 equalizes the waveform of the playback signal RF and the digitizing circuit 17 digitizes the resulting signal into the digitized signal S2. With reference to the digitized signal S2, the PLL circuit 18 generates the playback clock signal PBCK that serves as a reference for playing back the series of pits, as shown in FIG. 1. In playback of ordinary data, with reference to the playback clock signal PBCK, the decoder 20 processes the digitized signal S2 to play back data recorded on the optical disk 2.

In the OPC, when the playback of the data that has been test-written is initiated, the contact points of the switch circuits 43 and 37 in the PLL circuit 18 are switched at the predetermined point t0, as shown in FIG. 5, thereby switching the operational reference of the PLL circuit 18 from the playback signal RF to the writing clock signal WCK.

That is, the operation of the PLL circuit 18 can be switched from the generation of the playback clock signal PBCK based on the phase error between the playback clock signal PBCK detected by the phase comparator circuit 41 and the digitized signal S2 to the generation of the playback clock signal PBCK based on the phase error between the wobble clock signal WBCK detected by the phase-frequency comparator circuit 35 and the divided signal of the playback clock signal PBCK.

In this case, the optical disk apparatus 1 generates the playback clock signal PBCK in accordance with the meander of the grooves instead of the playback signal RF. In the optical disk apparatus 1, the divider circuit 32 divides the frequency of the writing clock signal WCK to create the wobble clock signal WBCK. The writing clock signal WCK serves as a reference for generating a series of pits and the playback clock signal PBCK serves as a reference for playing back the series of pits corresponding to the writing clock signal WCK. The frequency of the playback clock signal PBCK is divided by the divider circuit 36 by the same division ratio as that of the divider circuit 32, and the phase of the resulting clock is compared with the wobble clock signal WBCK. In this manner, the operational reference is switched to the writing clock signal WCK to generate the playback clock signal PBCK and the playback clock signal PBCK is held at the frequency of the original playback clock signal PBCK. Thus, before data that has been test-written is played back, the optical disk apparatus 1 holds the frequency of the playback clock signal PBCK to the frequency of the original playback clock signal PBCK in advance. It is not certain whether or not the playback signal RF obtained before data that has been test-written is played back in that manner (i.e., data represented by reference symbol PX in FIG. 5) can be used to generate the playback clock PBCK properly.

As described above, in the optical disk apparatus 1, the operational reference is switched to the writing clock signal WCK to generate the playback clock signal PBCK, and when the time period T1, which is long enough for holding the frequency of the playback clock signal PBCK to the frequency of the original playback clock signal PBCK, has elapsed, and time t1, at which the scanning of the starting sector in which test-writing has been performed is initiated, has been reached, the operational reference of the PLL circuit 18 is switched from the writing clock signal WCK to the playback signal RF.

That is, in FIG. 1, the contacts of the switch circuits 37 and 43 are switched, and the operation of the PLL circuit 18 is switched from the generation of the playback clock signal PBCK based on the phase error between the wobble clock signal WBCK detected by the phase-frequency comparator circuit 35 and the divided signal of the playback clock signal PBCK to the generation of the playback clock signal PBCK based on the phase difference between the playback clock signal PBCK detected by the phase comparator circuit 41 and the digitized signal S2.

In this manner, in the optical disk apparatus 1, the playback clock signal PBCK is played back from the playback signal RF that is obtained by playing back data that has been test-written. When the operation of the PLL circuit 18 is switched as described above, the frequency of the playback clock signal PBCK in the PLL circuit 18 is held to the frequency of the original playback clock signal PBCK in advance. As a result, this arrangement can securely avoid the pseudo lock so that the playback clock signal PBCK can be locked to the playback signal RF in a significantly short period of time.

In the optical disk apparatus 1, when the time period T2, which is long enough for locking the playback clock signal PBCK to the playback signal RF, has elapsed, the phase-error absolute-value detector circuit 51, shown in FIG. 6, in the jitter measuring circuit 25 detects the digitized signal S2 and determines the absolute value of the phase error relative to the playback clock signal PBCK at the rising edge of each digitized signal S2 to generate the error detection signal SER. The integration circuit 52 then starts integrating the error detection signal SER to provide the integration result IR, and the analog-to-digital converter circuit 53 sequentially performs analog-to-digital conversion of the integration result IR. Further, immediately before the playback of the starting sector is completed, the register 54A latches data output from the analog-to-digital converter circuit 53 to record the amount of jitter resulting from test-writing data that has been recorded in the starting sector.

In the optical disk apparatus 1, the integration processed by the integration circuit 52 and the latching processed by the registers 54B to 54n are repeated in the same manner as the process performed in the starting sector. The central processing unit 24 uses the results of the latching to determine, as an optimum amount of light for writing, an amount of light with which the amount of jitter is minimized. In addition, the central processing unit 24 controls the writing circuit 6 so as to perform writing with the optimum amount of light.

In the optical disk apparatus 1, when an instruction for writing is issued from a host device, the encoder 22 receives data output from the host device through the buffer memory 21, which in turn encodes and modulates the data. In response to the data output from the encoder 22, the writing circuit 6 intermittently causes the amount of light of the laser beam to rise from an amount of light for playing back to the optimum amount of light for writing, thereby allowing secure writing of the data output from the host device onto the optical disk 2. The decoder 20 also plays back the data written in this manner and outputs the data to the host device.

(3) Advantages of First Embodiment

According to the above configuration, generating the playback clock signal by changing the operational reference between the writing clock signal and the playback signal allows OPC based on the amount of jitter as the evaluation reference using a small area compared to the related art.

Specifically, the result of phase comparison between the wobble clock signal that is a divided signal of the writing clock signal and a divided signal of the playback clock signal and the result of the phase comparison between the playback signal and the playback clock signal are selectively output to the low-pass filter. In accordance with the signal output from the low-pass filter, the playback signal is generated. This arrangement allows generation of the playback clock signal with a simple configuration and with a satisfactory response speed.

Subsequent to test writing by changing the amount of light for writing sequentially in a step-by-step manner, the operational reference is switched from the writing clock signal to the playback signal to generate the playback clock signal. This arrangement makes it possible to start the playback of the test-writing data, to synchronize the playback clock signal with the playback signal in a short period of time, and to detect the amount of jitter, without recording linking data for synchronization. As a result, it is possible to determine an optimum amount of light based on the amount of jitter as the evaluation reference using a small area compared to the related art.

(4) Advantages of Second Embodiment

Figure 8:
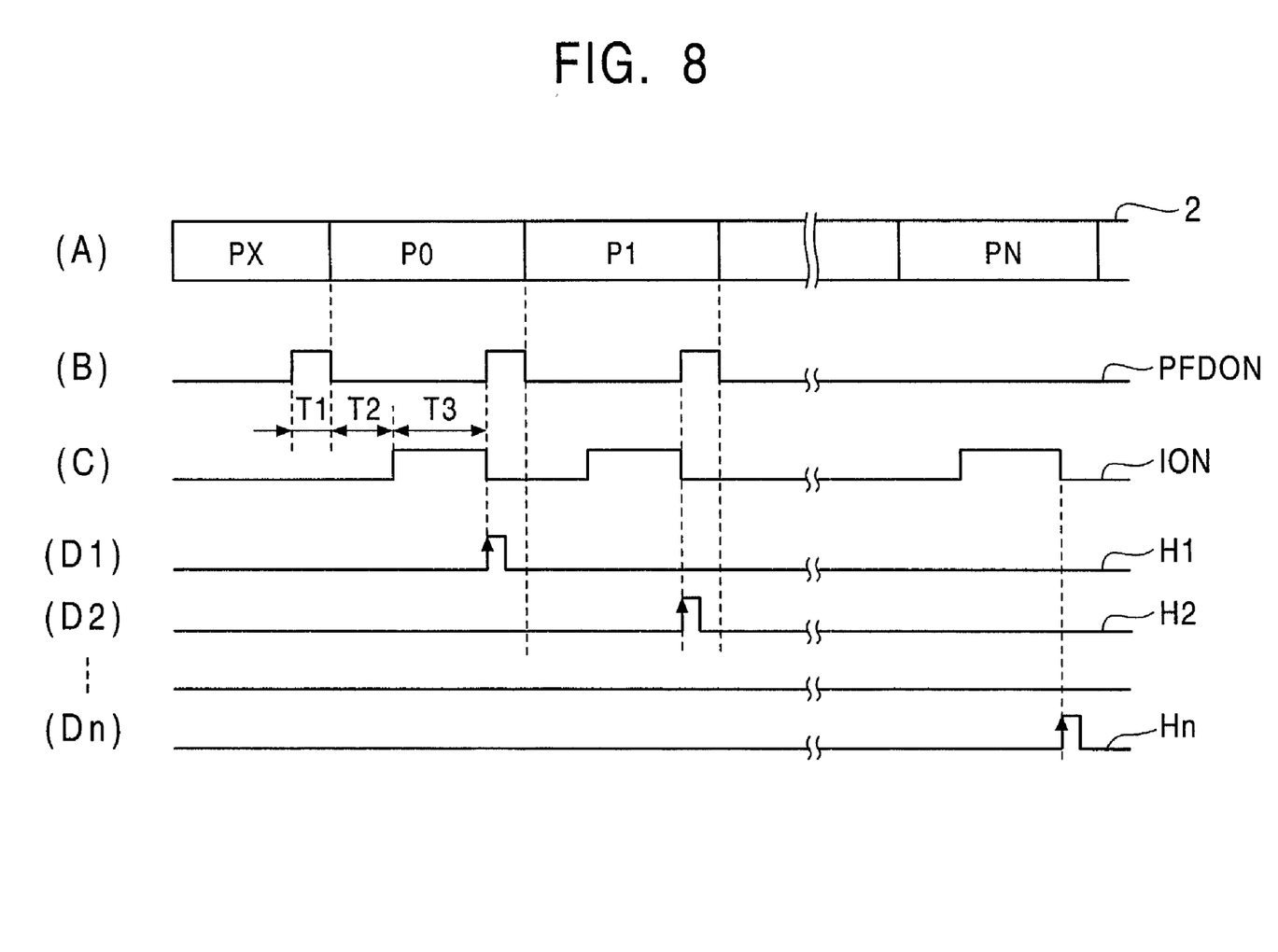
FIG. 8 is a time chart illustrating the operation of a jitter measuring circuit of an optical disk apparatus according to an second embodiment.

FIG. 8 is a time chart to illustrate processing of an optical disk apparatus according to a second embodiment of the present invention. The optical disk of this embodiment is configured in the same manner as the optical disk apparatus of the first embodiment, except that the timing signals, which are shown in the time chart, generated by the timing generator circuit 13 are different.

In this embodiment, the optical disk apparatus is pre-set such that the timing signal PFDON becomes high in the time period T1 not only in the starting sector in which test-writing data has been recorded but also in the subsequent sectors in the same manner. With this arrangement, the reference for generating the playback clock signal PBCK is switched in the time period T1 from the playback signal RF to a writing clock signal WPB for each sector.

In this manner, for each sector, switching the reference for generating the playback clock signal PBCK from the playback signal RF to the writing clock signal WPB allows proper determination of an optimum amount of light for writing, even when an amount of light for writing in the previous sector significantly deviates from the optimum amount of light.

(5) Other Embodiments

While the description in the above embodiments has been given to the case in which the playback clock signal PBCK is generated based on the result of phase comparison between the wobble clock signal and the signal output from the divider circuit and the writing clock signal is used as the operational reference, the present invention is not limited thereto. For example, an additional divider circuit may be added to the PLL circuit 11, as required, to divide the frequency of the writing clock signal WCK, so that the resulting clock signal instead of the wobble clock signal WBCK is supplied to the phase-frequency comparator circuit 35 of the PLL circuit 18. In such a case, the division ratio of the divider circuit 36 is set so as to correspond to the division ratio of that additional divider circuit. Thus, the present invention is widely applicable to various configurations in which the writing clock signal WCK is used as an operational reference.

While the description in the above embodiments has been given to the case in which test writing is performed by changing the amount of light sector by sector sequentially in a step-by-step manner, the present invention is not limited thereto. For example, the present invention is also widely applicable to a case in which test writing is performed by changing the amount of light a plurality of sectors by a plurality of sectors sequentially in a step-by-step manner.

While the description in the above embodiments has been given to the case in which test writing is performed sector by sector, the present invention is not limited thereto. Thus, the present invention is also widely applicable to a case in which test writing is performed, for example, block by block, frame by frame, or a plurality of frames by a plurality of frames.

While the description in the above embodiments has been given to the case in which test writing is performed by recording only test-writing data, the present invention is not limited thereto. Thus, the present invention is widely applicable to cases in which various test-writing data is recorded in various forms. For example, a sector for linking may be provided after or before the block or between the blocks, or an unrecorded sector may be provided after or before the block or between the blocks. Alternatively, when recording is performed block by block, a block for linking and/or an unrecorded block may be provided.

While the description in the above embodiments has been given to a case in which the integration is performed for all the sectors with the same period of time to measure the amount of jitter, the present invention is not limited thereto. For example, the time for the integration may be changed depending on each sector as required. In such a case, the integration can be initiated after detecting the synchronization of the playback clock signal PBCK with the playback signal RF in the PLL circuit.

While the description in the above embodiments has been given to a case in which test writing is performed with test-writing data in a random pattern, the present invention is not limited thereto and thus is widely applicable to processing with various forms of test-writing data.

While the description in the above embodiments has been given to a case in which, when test-writing data is played back to measure the amount of jitter, the reference for generating the playback clock signal is switched to the writing clock signal in a predetermined period of time, the present invention is not limited thereto. Thus, the present invention is also applicable to a case in which ordinary data is played back. Such an arrangement can reduce an area for recording linking data in recording ordinary data.

While the description in the above embodiments has been given to a case in which the optical disk apparatus accesses the optical disk 2 of a DVD+RW having a recording capacity of 4.7 gigabytes, the present invention is not limited thereto. Thus, the present invention is widely applicable to various optical disk apparatuses, including an optical disk apparatus for accessing an optical disk in a DVD+R or DVD-R/RW format. For an optical disk of a DVD-R/RW format, the ADIP decoder needs to be replaced by an LPP decoder for LPP (land pre-pits) to detect address data from the playback signal. In addition, the PLL circuit 18 can be operated in accordance with the wobble clock, with the division ratio of the divider circuits 32 and 36 being set to be 1/186.

What is claimed is:

1. An optical disk apparatus comprising:
   wobble-signal generating means for generating a wobble signal having a signal level that varies in accordance with the meander of a groove in an optical disk by processing a result of received return-light obtained by irradiating the optical disk with a laser beam;
   playback-signal generating means for generating a playback signal having a signal level that varies in accordance with a series of pits formed in the optical disk by processing the result of the received return-light;
   writing-clock-signal generating means for generating a writing clock signal that serves as a reference for generating the series of pits, with reference to the wobble signal; and
   playback-clock-signal generating means for generating a playback clock signal that serves as a reference for playing back the series of pits, by switching an operational reference between the writing clock signal and the playback signal.

2. An optical disk apparatus according to claim 1, wherein the playback-clock-signal generating means includes:
   a first phase comparator circuit for outputting a result of phase comparison between a frequency-divided signal of the writing clock signal and a frequency-divided signal of the playback clock signal;
   a second phase comparator circuit for outputting the result of phase comparison between the playback signal and the playback clock signal;
   a selector circuit for selectively outputting the results of the phase comparison performed by the first and second phase comparator circuits;
   a low-pass filter for limiting the bandwidth of a signal output from the selector circuit; and
   an oscillator circuit for generating the playback clock signal in accordance with a signal output from the low-pass filter.

3. An optical disk apparatus according to claim 1, further comprising:
   test-writing means for recording predetermined test-writing data on the optical disk by changing the amount of light of the laser beam in a step-by-step manner with reference to the writing clock signal;
   jitter measuring means for measuring the amount of jitter for each amount of light by processing the playback signal with reference to the playback clock signal, the playback signal being obtained by playing back the test-writing data; and
   light-intensity setting means for setting the amount of light of the laser beam in accordance with a result of the measurement by the jitter measuring means;
   wherein the playback-clock-signal generating means generates the playback clock signal based on the writing clock signal as an operational reference from a predetermined time before the playback of the test-writing data is initiated, and switches the operational reference from the writing clock signal to the playback signal after the playback of the test-writing data is initiated; and wherein the jitter measuring means initiates the measuring of the amount of jitter when a predetermined time has elapsed subsequent to the switching of the operational reference.

4. An optical disk apparatus according to claim 1, further comprising:

test-writing means for recording predetermined test-writing data on the optical disk by changing the amount of light of the laser beam in a step-by-step manner with reference to the writing clock signal;

jitter measuring means for measuring the amount of jitter for each amount of light by processing the playback signal with reference to the playback clock signal, the playback signal being obtained by playing back the test-writing data; and light-intensity setting means for setting the amount of light of the laser beam in accordance with a result of the measurement by the jitter measuring means;

wherein the playback-clock-signal generating means generates the playback clock signal based on the writing clock signal as an operational reference for each piece of test-writing data with each amount of light from a predetermined time before the playback of the test-writing data is initiated, and switches the operational reference from the writing clock signal to the playback signal after the playback of the test-writing data is initiated; and wherein the jitter measuring means initiates the measurement of the amount of jitter when a predetermined time has elapsed subsequent to the switching of the operational reference.

5. A method for generating a clock signal of an optical disk apparatus including wobble-signal generating means for generating a wobble signal having a signal level that varies in accordance with the meander of a groove in an optical disk by processing a result of received return-light obtained by irradiating the optical disk with a laser beam; playback-signal generating means for generating a playback signal having a signal level that varies in accordance with a series of pits formed in the optical disk by processing the result of the received return-light; and writing-clock-signal generating means for generating a writing clock signal that serves as a reference for generating the series of pits, with reference to the wobble signal, the method comprising a playback-clock generating step of generating a playback clock signal that serves as a reference for playing back the series of pits by switching an operational reference between the writing clock signal and the playback signal.

6. A method for setting an amount of light of an optical disk apparatus including wobble-signal generating means for generating a wobble signal having a signal level that varies in accordance with the meander of a groove in an optical disk by processing a result of received return-light obtained by irradiating the optical disk with a laser beam; playback-signal generating means for generating a playback signal having a signal level that varies in accordance with a series of pits formed in the optical disk by processing the result of the received return-light; writing-clock-signal generating means for generating a writing clock signal that serves as a reference for generating the series of pits, with reference to the wobble signal; and playback-clock-signal generating means for generating a playback clock signal that serves as a reference for playing back the series of pits, with reference to the playback signal, the method comprising:

a test-writing step of recording predetermined test-writing data on the optical disk by changing the amount of light of the laser beam in a step-by-step manner with reference to the writing clock signal;

a jitter measuring step of measuring the amount of jitter for each amount of light by processing the playback signal with reference to the playback clock signal, the playback signal being obtained by playing back the test-writing data; and a light-intensity setting step of setting the amount of light of the laser beam in accordance with the result of measuring the amount of jitter, wherein the playback-clock-signal generating means generates the playback clock signal based on the writing clock signal as an operational reference from a predetermined time before the playback of the test-writing data is initiated and switches the operational reference from the writing clock signal to the playback signal after the playback of the test-writing data is initiated, and when a predetermined time has elapsed after the switching of the operational reference, the jitter measuring step initiates measuring the amount of jitter.

7. A method for setting an amount of light of an optical disk apparatus including wobble-signal generating means for generating a wobble signal having a signal level that varies in accordance with the meander of a groove in an optical disk by processing a result of received return-light obtained by irradiating the optical disk with a laser beam; playback-signal generating means for generating a playback signal having a signal level that varies in accordance with a series of pits formed in the optical disk by processing the result of the received return-light; writing-clock-signal generating means for generating a writing clock signal that serves as a reference for generating the series of pits, with reference to the wobble signal; and playback-clock-signal generating means for generating a playback clock signal that serves as a reference for playing back the series of pits, with reference to the playback signal, the method comprising:

a test-writing step of recording predetermined test-writing data on the optical disk by changing the amount of light of the laser beam in a step-by-step manner with reference to the writing clock signal;

a jitter measuring step of measuring the amount of jitter for each amount of light by processing the playback signal with reference to the playback clock signal, the playback signal being obtained by playing back the test-writing data; and a light-intensity setting step of setting the amount of light of the laser beam in accordance with the result of measuring the amount of jitter;

wherein the playback-clock-signal generating means generates the playback clock signal based on the writing clock signal as an operational reference from a predetermined time before the playback of the test-writing data for each amount of light is initiated and the playback-clock-signal generating means switches the operational reference from the writing clock signal to the playback signal after the playback of the test-writing data for each amount of light is initiated, and when a predetermined time has elapsed after the switching of the operational reference, the jitter measuring step initiates measuring the amount of jitter.

* * * * *